United States Patent [19]

Thomas, Jr.

[11] Patent Number: 5,164,208

[45] Date of Patent: Nov. 17, 1992

[54] APPARATUS FOR THE FORMATION OF A CLAMPED WAVE LID SEAL STRUCTURE

[75] Inventor: John S. Thomas, Jr., Williamsburg, Va.

[73] Assignee: James River II, Inc., Milford, Ohio

[21] Appl. No.: 685,100

[22] Filed: Apr. 15, 1991

[51] Int. Cl.$^5$ .................. B29C 65/18; B65D 77/20
[52] U.S. Cl. ........................ 425/396; 425/397; 425/400; 425/403; 425/411; 425/809; 156/69; 156/581; 156/583.1
[58] Field of Search .......... 425/394, 395, 396, 400, 425/403, 397, 407, 408, 411, 422, 116, 128; 156/69, 581, 583.1; 100/237; 53/478, 300, 341, 342

[56] References Cited

U.S. PATENT DOCUMENTS

| | | |
|---|---|---|
| 3,491,935 | 1/1970 | Trotter, Jr. et al. ............ 229/219 |
| 3,679,509 | 7/1972 | Fielibert ........................ 156/182 |
| 4,171,236 | 10/1979 | Winchell et al. ............... 156/69 |
| 4,496,046 | 1/1985 | Stone et al. .................... 206/219 |
| 4,519,499 | 5/1985 | Stone et al. .................... 206/219 |
| 4,913,307 | 4/1990 | Takata et al. .................. 156/69 |
| 4,961,513 | 10/1990 | Gossedge et al. .............. 220/276 |
| 4,969,965 | 11/1990 | Matty et al. ................... 156/69 |
| 4,991,375 | 2/1991 | Rague et al. .................. 156/581 |
| 5,032,213 | 7/1991 | Thomas, Jr. ................... 156/69 |
| 5,034,074 | 7/1991 | Thomas, Jr. ................... 156/69 |

FOREIGN PATENT DOCUMENTS

| | | |
|---|---|---|
| 3016235 | 10/1981 | Fed. Rep. of Germany ........ 53/478 |
| 2-219766 | 9/1990 | Japan ..................................... 53/478 |
| 2-219768 | 9/1990 | Japan ..................................... 53/478 |
| 2-233378 | 9/1990 | Japan ..................................... 53/478 |
| 2213125A | 8/1989 | United Kingdom . |

Primary Examiner—Jay H. Woo
Assistant Examiner—Khanh P. Nguyen
Attorney, Agent, or Firm—Stanley M. Teigland

[57] ABSTRACT

An apparatus is disclosed that engages a lid to a container by the formation of interlocking waves of lid material and container material. The interlocking waves are geometrically aligned relative to the interior of the container so as to maximize the burst strength of the container, and also to minimize the force required to peel the lid from the container. An unheated clamp head of the apparatus is used to clamp the lid structure immediately adjacent a heated seal head used to form the interlocking wave structure about the inside rim of the container, so as to prevent any melted portions of the container or lid from flowing to or toward the outside rim of the container, so as to prevent the formation of similar interlocking waves about the outside rim of the container. The prevented formation of interlocking waves about the outside rim of the container yields a clamped-wave seal structure having reduced peel initiation forces and reduced average peel forces, without affecting the resistance of the container/lid system to high burst pressures typically encountered under retort conditions.

2 Claims, 6 Drawing Sheets

□ 405 °F
△ 425 °F
○ 445 °F

FIG. 5A
○ SIMPLE WAVE SEAL STRUCTURE - HDPE (REF. FIG. 5B)
△ CLAMPED WAVE SEAL STRUCTURE - HDPE (REF. FIG. 2)
— CONVENTIONAL ADHESIVE SEAL SYSTEM
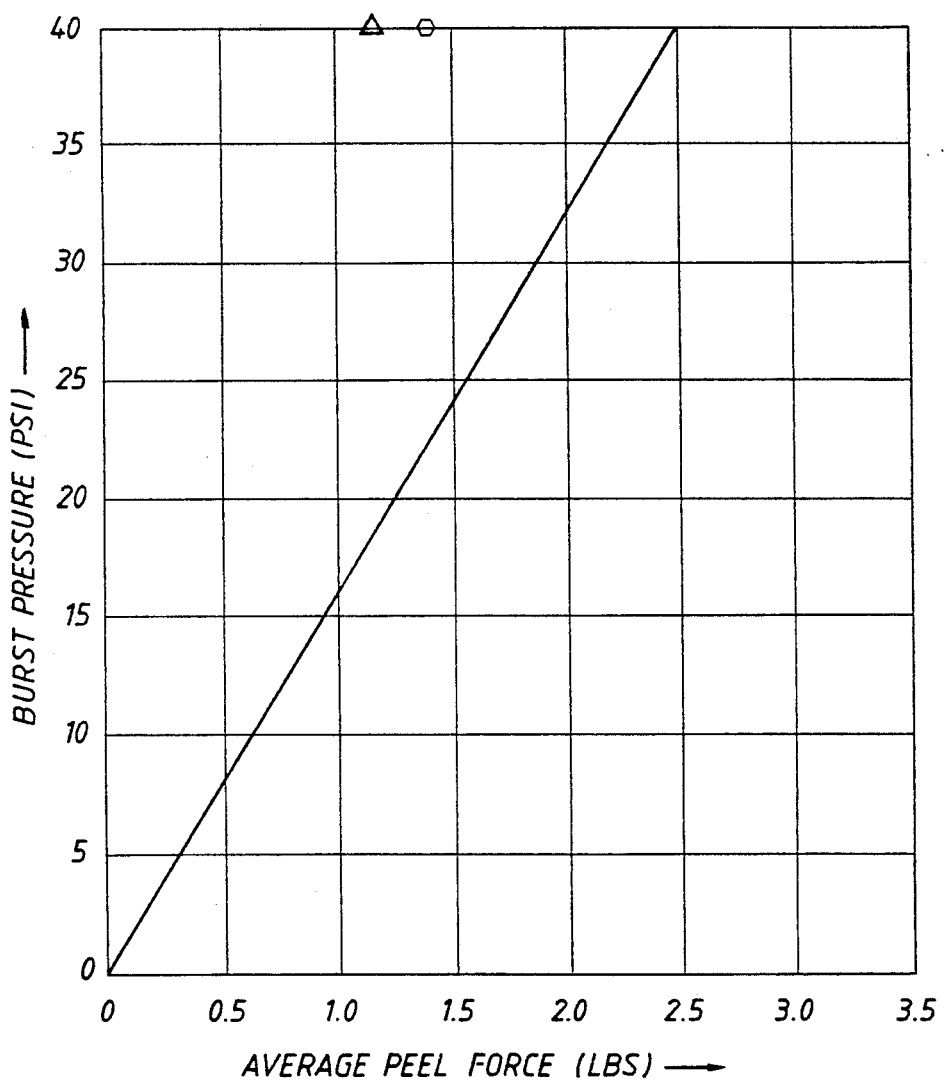
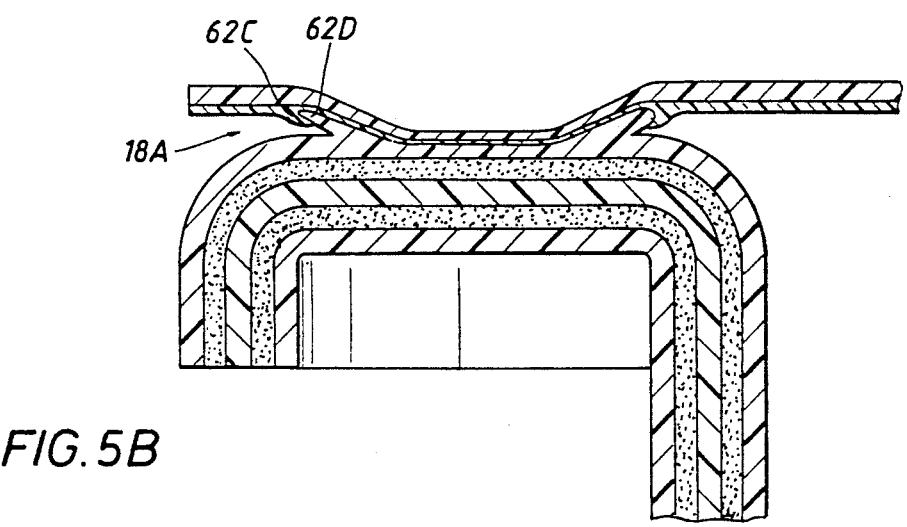
FIG. 5B ○ SIMPLE WAVE SEAL STRUCTURE-HDPE (REF. FIG. 5B)
△ CLAMPED WAVE SEAL STRUCTURE-HDPE (REF. FIG. 2)
— CONVENTIONAL ADHESIVE SEAL SYSTEM — FRESCO LID SYSTEM (.00048 PET // EVAX // .002 LDPE)
   WIDTH PE = 14.2 mil, THETA = 10.2 DEG.
-- ALCOA LID SYSTEM (.00048 PET //.002 AL //.0015 LDPE)
   WIDTH PE = 3.2 mil, THETA = 2 DEG.

APPARATUS FOR THE FORMATION OF A CLAMPED WAVE LID SEAL STRUCTURE

RELATED APPLICATIONS

This invention is related to co-pending patent applications Ser. No. 471,329, entitled "Apparatus For a Peelable Lid", filed Jan. 29, 1990, now abandoned, Ser. No. 471,330, entitled "Method For the formation of a Peelable Lid", filed Jan. 29, 1990, now U.S. Pat. No. 5,034,074, Ser. No. 685,243, entitled "Clamped Wave Lid Seal Structure", filed Apr. 15, 1991, and Ser. No. 685,242, entitled "Method for the Formation of a Clamped Wave Seal Structure", filed Apr. 15, 1991, John S. Thomas Jr. inventor.

BACKGROUND OF THE INVENTION

1. Field of the Invention

This invention relates to an apparatus used to form an article of manufacture comprising a container having an easily peelable clamped-wave container/lid seal system.

2. Discussion of the Prior Art

As discussed in U.S. Pat. No. 3,491,935 packages of thermoplastic materials have been used extensively in various industries for dispensing a wide variety of both flowable and non-flowable materials. These packages consist of containers that have been sealed in various ways, and recently there has been a great need for a container sealed with thin-wall sealing material that can be easily removed by the consumer to access the contents of the sealed package.

The '935 patent uses a differential method of forming a peelable seal for the containers in which the two thermoplastic materials selected to form the lid and the container have different softening points. These materials are heated while they are in contact with one another so that the first material fuses and secures itself to the second material, and thereby forms the desired peelable seal without fusing the second material (lines 15-22 of col. 2).

In the sealing operation of the '935 patent, the heat flows through the closure material from a heated sealing die which also extrudes a portion of the closure material from beneath the die, so as to form a bead on the flange of the container. It should be noted that the beads formed in this reference are only made of the lid polymer are not on the inner rim of the flange, and also that a combination clamp head and seal head apparatus is not used to form the seal.

U.S. Pat. No. 4,519,499 issued to Stone et al on May 28, 1985, (as well as U.S. Pat. No. 4,496,046, same inventor and assignee), discloses a container having a selectively openable seal line and peelable barrier means. The container is made of two sheets of the same or similar material which are secured to each other by a seal that includes a bead area of increased thickness at the break end of it, (FIGS. 1, 2 and 3; lines 46-48 of col. 2). The sealing die used for sealing the two sheets together consists of a die head and a mirror image die head. Each of them has a convex projection and a bevel surface formed 5 degrees from horizontal (FIGS. 7, 8, 9, and 10, lines 15-32 of col. 6). This reference relates to the use of a sealing die having a beveled surface and the formation of beads having the same or similar melting temperatures. However, it does not relate to the formation of beads of different material on the inner rim of a container, or the use of a combination seal head and clamp head to form a clamped-wave seal structure.

U.S. Pat. No. 3,679,509 issued to Fielibert on Jul. 25, 1972 relates to a process for sealing laminated materials. This reference uses a V-shaped bar as its sealing head in which the obtuse angle ranges from 150°-170° (lines 14-21 of col. 2). The use of a clamp head in combination with a seal head is not disclosed.

U.S. Pat. No. 4,171,236 discloses a method for forming a fractionable seal of the type wherein a plastic cup-shaped closure is hermetically sealed to a plastic plainer surface, such as the neck of pharmaceutical solution containers. The seal is formed with the closure by forcing a die heated above the melting point of the plastic materials into the desired plainer surface. Both the plainer surface and the closure adjacent thereto become molten and the surface material is displaced to form a fused seal transverse to the surface. Due to the design of the die, a frangible section is formed in the vertical sidewall of the depression. This reference does not disclose the formation of any beads on the inside rim of a container flange, nor the use of a clamp head to prevent molten lid/container material from flowing toward the outside rim of a container.

U.S. Pat. No. 4,961,513 issued Oct. 9, 1990 to Gossedge et al, (UK Patent Application GB 2,213,125A), discloses the formation of beads on both the inside and the outside rims of a container flange, but the failure plane formed during removable of the lid from the container is defined in a complex manner through both the lid and the container flange material. Gossedge's complex failure plane design, which is dependent on the "thinness" of ears projecting from the container flange material for successful operation, can understandably lead to admittedly "unacceptable", (FIG. 5 of Gossedge), failure plane variances such as ". . . the HDPE layer 12 will tear and thereafter delaminate from the foil 14 starting at the point B, in which case satisfactory peeling of the closure away from the rim will not have been achieved." (column 4 lines 17 through 48 of Gossedge). More importantly, The Gossedge reference does not teach the use of a clamp head in combination with a seal head, or the formation of a bead only on the inside rim of the container so as to reduce peel initiation forces.

In food packaging, the area of the invention, it is important that the lid remain fixed to the container during distribution of the closed container via various transportation routes to the eventual consumer. In an attempt to standardize the survivability determination of sealed containers, the U.S.D.A. has defined the "Restrained Burst Test" as means of measuring this ability to maintain package integrity. The restrained burst test involves pressurizing the inside of the subject container with compressed air. The seal container must be able to maintain +5 psig between the inside and outside of the container for at least 60 seconds.

Unfortunately, when one increases the survivability of the package by increasing the width and strength of the seal area between the container and the lid, (such as to withstand a 10 psig pressure differential), the peel strength in the prior art devices also increases in a linear manner such that it becomes very hard for the purchaser of the packaged food container to open the lid. The designer of the food container is therefore faced with a Hobson's choice, wherein a container that may survive the transportation phase will not be openable by the subsequent purchaser, or where an "easy open"

container will not survive the transportation process. Increasing the burst strength of a container causes an undesirable increase in the peel strength required to open the container.

Most food packers require a minimum of 10 psi burst pressure and would like 15 psi. With conventional lid sealing, 15 psi bursts requires a material that has a peel strength of 10.75 lbs/in. This is extremely difficult to peel.

As disclosed in the above-referenced first two co-pending patent applications, a simple "interlocking wave" seal structure was developed that gave the sealed container a high burst pressure, yet allowed the lid to be peeled easily from the container, once the lid peeling process was started. In other words the average peel force necessary to continuously pull the lid from the container was reduced below that encountered in the conventional lid/container adhesive sealing systems. (Please reference FIGS. 5A, 5B, and 5C of this specification for both pictorial and graphic description of the simple wave seal structure).

The force required to start peeling the lid from the container, (the peel initiation force), however tended in some instances to be slightly higher than that encountered during the peel initiation of a conventional lid/-container adhesive seal system, (reference FIG. 5C), even though the average peel force was substantially lower.

A seal structure therefore needs to be developed that has a lower peel initiation force when compared to a conventional adhesive seal system, as well as a lower average peel force. Such a system should not, however, sacrifice any high burst pressure capabilities for the benefit of the lower peel initiation and lower average peel forces. The development of such a seal structure should include an apparatus for the formation of the seal structure.

SUMMARY OF THE INVENTION

In the preferred embodiment of the present invention, the simple "interlocking wave" seal system is modified to reduce the unnecessarily high peel initiation forces by elimination of the interlocking wave structure located adjacent the outside rim of the container/lid junction. To eliminate this interlocking wave, the single piece seal head of the previous invention is now replaced with two elements, a heated seal head for forming the interlocking waves about the inside rim of the container, along with a clamp head placed outward of the heated seal head which initially clamps the lid to the container flange, and also prevents any molten lid or container material from flowing outward to or toward the container outside rim.

The resulting "clamped-wave" seal structure produced by the apparatus of the invention has significantly lower peel initiation forces than the previous simple wave seal system, as well as even lower average peel forces. Resistance to internal burst pressures is not sacrificed in any manner to gain these improved reductions in peel initiation and average peel forces.

The clamped-wave seal structure is shown in FIG. 2, whereas the previous simple "interlocking wave" seal structure is shown in FIG. 5B. The clamp head effectively prevents any of the molten material heated by the heated seal head from flowing toward the outside rim of the container to form a bead about the outside rim, thereby yielding a relatively planar lid/container junction surface adjacent the container outside rim.

The clamped-wave seal structure produced by the apparatus of the invention therefore yields a seal system, such as for 3" diameter cups, having a burst pressure of 40 psi, a peel initiation force of only two lbs. (versus the previous peel initiation force of 15 lbs. for the simple wave seal structure), and an average peel force of only 0.75 lbs. (reduced significantly from the simple wave average peel force of 1.4 lbs., and significantly lower than the average peel force of 2.5 lbs. of the conventional adhesive seal system).

Interaction of the heated seal head immediately adjacent the relatively cooler clamp head forms a lid elevation change area in the mating area of the lid and container flange. The lid elevation change area requires significantly less peel initiation force input than the previous simple wave design which used interlocking waves formed about the outside rim of the container flange system. It is much easier to peel through the lid elevation change area than through the previous interlocking wave area.

It is therefore an object of the invention to provide an article comprising a container lid, and a container flange shaped to operatively engage the lid by interlocking waves formed at the inside rim of the junction of the container lid with the container flange. The lid and flange are bonded to each other across a sealed area defined from the interlocking waves toward the outside rim of the container lid system. A lid elevation change area is also defined outward from the interlocking waves toward the outside rim, the lid elevation change area being formed by the interaction of a clamp head closely-spaced adjacent a heated seal head.

It is a feature of the invention to describe the apparatus used to form the clamped-wave seal structure, the apparatus including a clamp head and heated seal head.

By use of the apparatus of the present invention it is an object of the present invention to fabricate a container/lid clamped-wave seal structure having a low average peel force, a low peel initiation force, and a high burst pressure, compared to a conventional adhesive seal system.

These and other features, objects and advantages of the present invention will become apparent from the following detailed description, wherein reference is made to the Figures in the accompanying drawings.

BRIEF DESCRIPTION OF THE DRAWINGS

FIG. 5A is a graph of burst pressure versus average peel force for a clamped-wave seal structure, a simple wave seal structure, and a conventional adhesive seal system.

FIG. 5B shows a schematic representation in a side view and cross section of a simple wave seal structure of the prior copending patent applications.

DESCRIPTION OF THE PREFERRED EMBODIMENT

Figure 1:
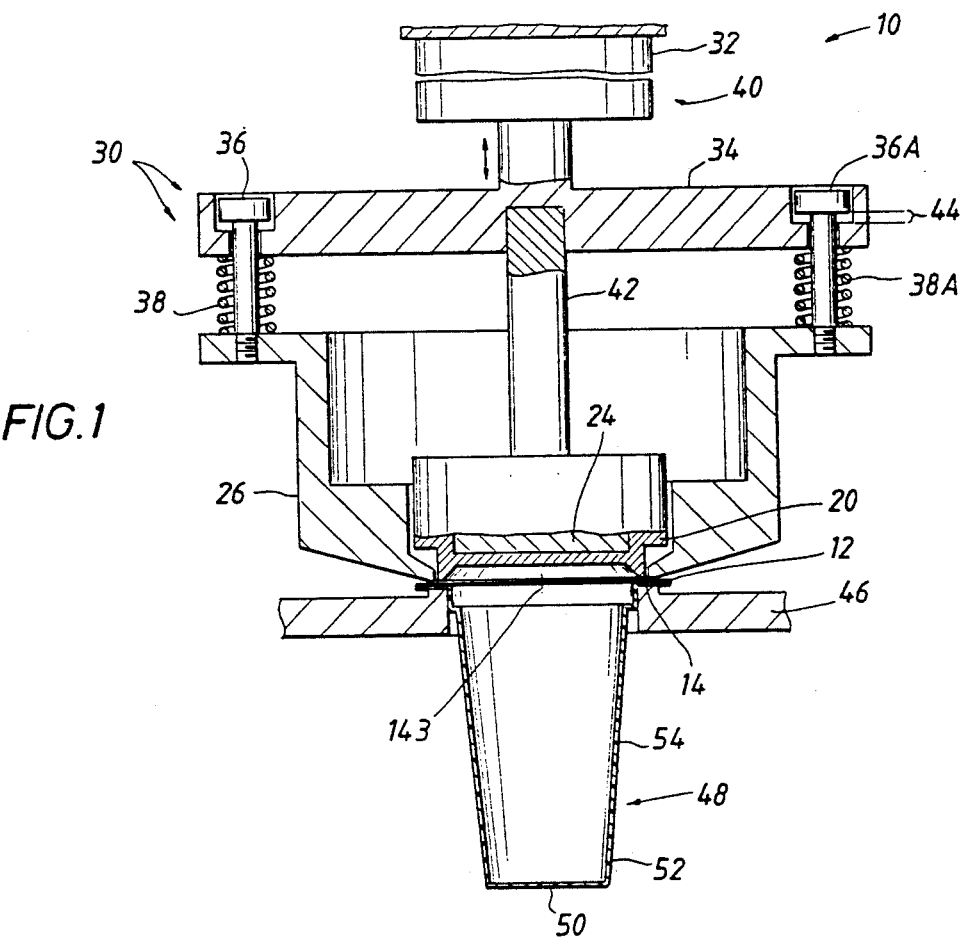
FIG. 1 shows a schematic representation in a side view and partial cross section of the clamp head and seal head commencing to join the lid to the container flange.

Referring now to FIG. 1 an apparatus 10 for forming a peelable clamped-wave seal structure between a first material of a lid 12 and a second material of a container flange 14 is shown. It should be well known that the clamped-wave seal structure may also be formed on a flexible container not having a flange, such as on a "drip" bag for administering saline solutions to patients, for example. Apparatus 10 is preferably operable, of course, when the lid 12 is positioned over the flange 14. Inside rim 16 (FIG. 2) is defined at the interior junction of the lid to the container, (when the lid rests upon the container flange), and outside rim 18 (FIG. 2) is defined in a similar manner at the exterior junction of the lid to the container.

Apparatus 10 can be seen to comprise a heated seal head 20 having a shaped surface 22 (FIG. 3A) dimensioned for cooperation with the lid when the lid is positioned over the flange. Heated seal head can be seen to include a heater 24 operatively engaged to the heated seal head to heat the seal head, as is well known to the art.

The apparatus can also be seen to include a clamp head 26 having a shaped surface 28 (FIG. 3) dimensioned for cooperation with the lid when the lid is positioned over the flange, the clamp head in the present embodiment positioned outward from the heated seal head, i.e. positioned toward the container outside rim 18. It should be well recognized that the positions of the heated seal head and clamp head may be altered as necessary to meet various design and fabrication objectives.

Apparatus 10 also includes clamp head movement means 30 such as the pneumatic cylinder 32 acting through mounting plate 34, shoulder bolts 36, 36A, and springs 38, 38A to move the clamp head downward into contact with the lid so as to clamp the lid to the container flange.

Apparatus 10 also includes seal head movement means 40 in the present embodiment also including pneumatic cylinder 32 coupled through mounting plate 34 and support shaft 42 in order to move the heated seal head downward into contact with the lid positioned over the flange 14. As explained in further detail later in this specification, the shaped surface of the seal head and the shaped surface of the clamp head are adapted to form interlocking waves around the inside rim of the container, as well as a lid elevation change area toward the outside rim of the container.

In operation, the clamp head and the heated seal head proceed downward in tandem toward the lid 12, the clamp head preceding the seal head by approximately 0.050 inches. The clamp head 26 therefore contacts the lid 12 before the heated seal head 20 and clamps the lid to the container flange prior to the heated seal head contacting the lid. The clamp head 26 is spring loaded to the mounting plate 34 such that after contact with the lid, springs 38, 38A compress, such that when the heated seal head 20 contacts the lid, offset dimension D 44 is approximately 0.050 inches.

In the preferred embodiment pneumatic cylinder 32 drives both the heated seal head and the clamp head downward, though it should be well recognized that many other mechanical apparatus may be used to accomplish the same mechanical result. The use of different container/lid material systems will of course vary the offset dimension D 44, along with other process variables.

The lid 12 and container flange 14 are supported by a support die 46 during the formation of the clamped-wave seal structure, as is well known to the art. In one preferred embodiment, the lid 12 may be joined to the container flange 14 in order to properly seal a food container 48 typically having a base 50 and an upwardly extending wall 52 formed from a second sheet 54 of a homogeneous and/or laminated material, depending on the required barrier properties. The lid, of course, may be referred to as a first sheet 56 (FIG. 2) again either formed from a homogeneous material, or a laminate structure.

Figure 2:
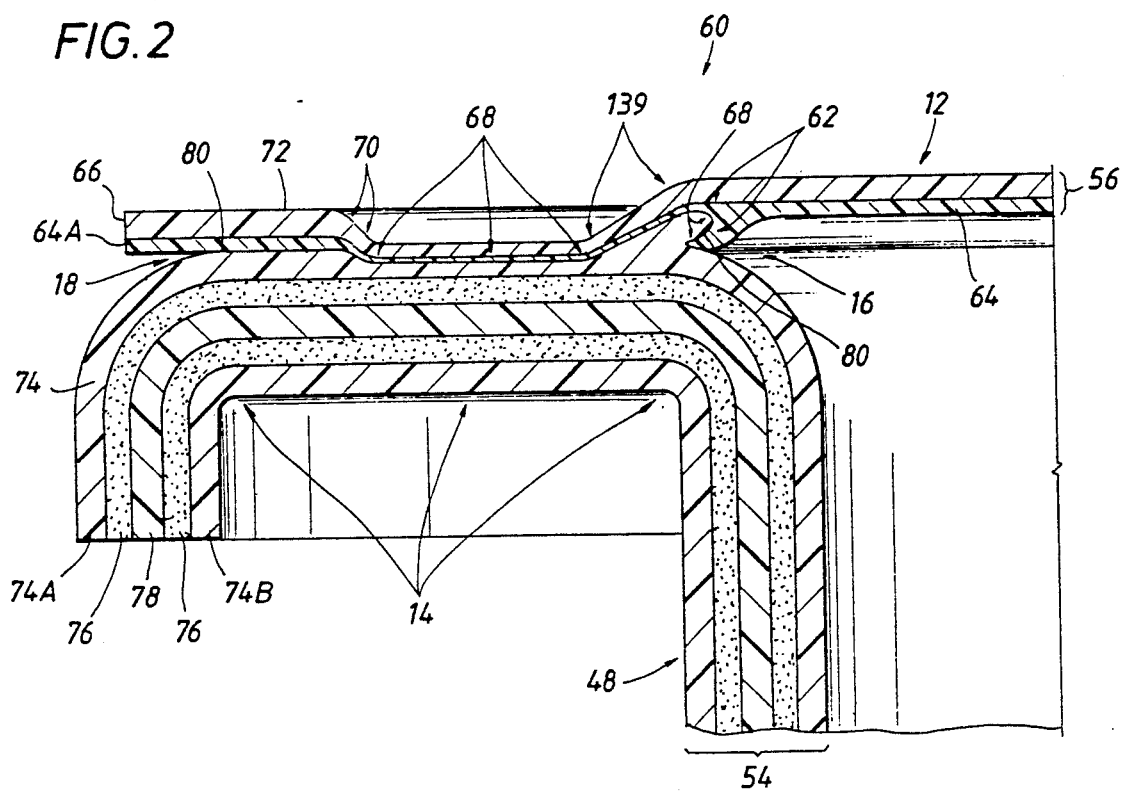
FIG. 2 shows a schematic representation in a side view and cross section of the clamped-wave seal structure.

Referring now to FIG. 2, the clamped-wave seal structure 60 can be seen to include interlocking waves 62 shown positioned adjacent the container inside rim 16, formed from a first material 64 (typically a high density polyethylene/polyisobutylene layer 64A, the PE layer 64A typically topped by a layer 66 of PET/PVDC/PET). Seal structure 60 can also be seen to include the sealed area 68 formed from the interlocking waves 62 toward the outside rim 18 generally in the area of contact of the heated seal head 20.

The extent of the sealed area 68 would of course depend upon the amount of heat and/or pressure transferred into the first sheet and second sheet 54 by the heated seal head 20 and the clamp head. A lid elevation change area 70 which forms a portion of the clamped-wave seal structure is formed adjacent or included within the seal area 68 and forms a general planar transition of the affected material layers from the relatively lower sealed area 68 up to the upper surface 72 of the lid. Laminated layers within the lid elevation change area and located beneath the upper surface 72 may, of course, be included within portions of the seal area. The sealed area 68 may, for example, extend outward and include portions of the junction surface 80.

In a preferred embodiment, however, the temperature of the clamp head 26 is maintained low enough to avoid melting in the area under the clamp, such that the sealed area is generally that as shown in FIG. 2.

The second sheet 54 of the container would include in one embodiment second material 74 which comprises a layer of polypropylene 74A, laminated adjacent a layer of adhesive 76, laminated adjacent a layer of EVOH 78, laminated adjacent another layer of adhesive 76, laminated adjacent another layer of polypropylene 74B. Such a laminated second sheet 54 structure would form the typical container 48 having the container flange 14 defined about the exterior upper periphery thereof.

Container flange 14 adjacent the container outside rim 18 would also include the flange junction surface 80 being defined where the first material 64 contacts the second material 74 of the container flange, with or without being bonded thereto.

Figure 3A:
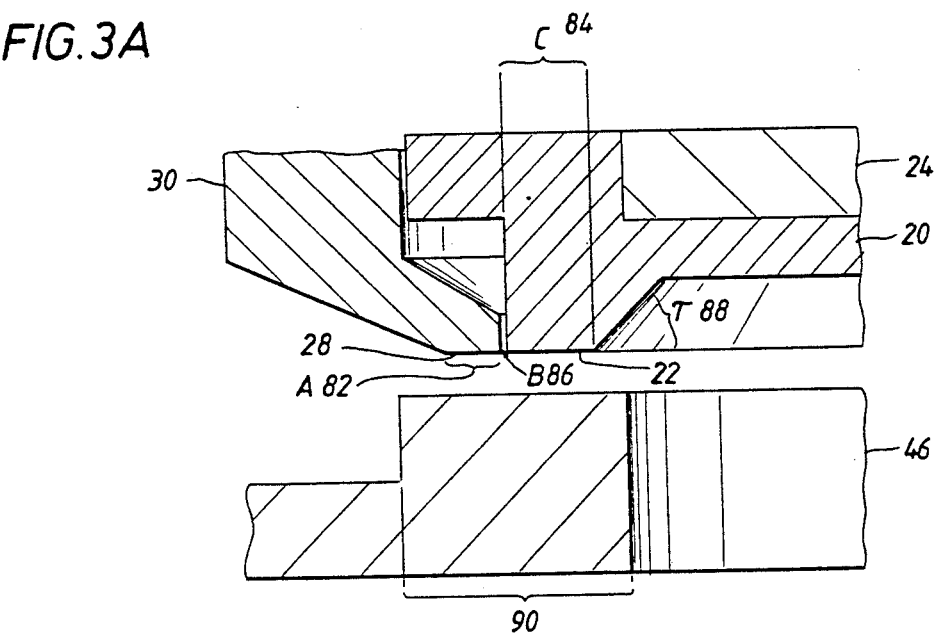
FIG. 3A shows a schematic representation in cross section of the clamp head and heated seal head positioned adjacent the support die.

Referring now to FIG. 3A, in a preferred embodiment, clamped head shaped surface 28 would have a dimension A 82 of 0.025 inches. The heated seal head 20 would have a shaped surface 22 dimension C 84 of 0.050 inches where the shaped surface contacts the lid. The clamp head 30 would be spaced from the heated seal head 20 by dimension B 86 of 0.005 inches. Angle $\tau$ 88 would typically have a dimension of approximately 50°, though it should be well understood that Angle $\tau$ 88 may have values from about 30 to about 55 degrees. The heated seal head would be forced 0.006 inches into the lid, at the point of maximum penetration, the penetration being about 0.008 inches below the clamped head shaped surface 28.

Support die 46 would include a support die shoulder 90 spaced evenly beneath the combined clamp head shaped surface and the heated seal head shaped surface 22. It should be well understood that the above dimensions may be varied depending on the container/lid material system to be joined, though the above dimensions are representative of those necessary to form the seal structure given the material shown in FIG. 2.

Figure 3B:
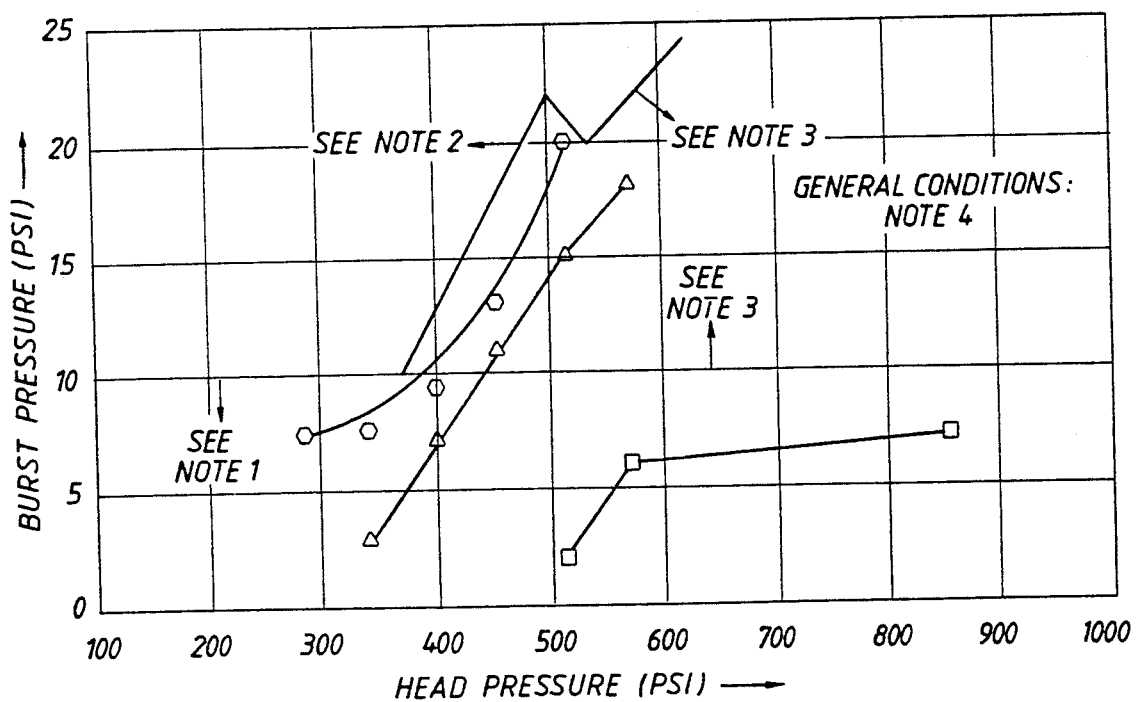
FIG. 3B represents in graphical fashion the desirable operating parameters for the heated seal head, in particular the heated seal head temperature and the heated seal head pressure.

Referring now to FIG. 3B the proper heated seal head pressure ranges and temperature ranges use to form the structure in FIG. 2 are shown. The graph may be explained by reference to the following notes:

Note 1: Unacceptably low (less than 10 psi) burst pressures exist in this region.

Note 2: Lid damage due to high heated seal head temperature occurs in this region, therefore operation in this region should be avoided. Generally, PET is a common material to use on the outside of all plastic lids because it has a high melt temperature of 475° F. and is relatively inexpensive. Seal temperature cannot exceed the melt point of the PET and this limit is noted on the graph. It should be noted, of course, that foil based lid materials can tolerate much higher temperatures than PET and operation would be possible in certain portions of this region depending on the choice of lid and/or container flange materials.

Note 3: This region represents the area of desired operation for the heated seal head (for the system shown in FIG. 2). Note that the heated seal head would have a temperature higher than 405° F. (required for a burst pressure greater than 10 psi), yet the temperature would not significantly exceed 445° F. due to possible lid damage due to high temperature.

Note 4: General operating conditions therefore would be as follows: time of clamped-wave seal structure formation would be approximately 1 second, clamp pressure would be from 100 to 600 psi (the process is not particularly sensitive to clamp pressure). Use of such operating parameters during the formation of a 76 mm diameter cup having a surface layer of 2 melt flow rate polypropylene second material 74A and low density polyethylene lid sealant first material 64 would yield a clamped-wave seal structure having a peel initiation force of 2.0 lbs., an average peel force of 0.9 lbs, and a burst pressure of 25 psi. Please note that a first material 64 of high density polyethylene yields a peel initiation force of 2.5 lbs, an average peel of 1.2 lbs and a burst pressure of 40 psi (Reference FIGS. 5a and 5c).

It should be well understood that other operating conditions would exist for other lid sealant systems. The lid in a preferred embodiment will have a thickness of approximately 0.0045 inches whereas the container 48 second sheet will have a thickness of approximately 0.030 inches. The high density polyethylene layer 64A will have a thickness of approximately 0.002 inches, the first material 64 having a melting temperature of from about 125° to about 140° C. The top layer of the lid 66 (PET/PVDC/PET) as is commonly used in the top lid structures of food containers would have a thickness of approximately 0.0025 inches. Alternatively, of course, the top layer could be aluminum foil. Layers 64A, 66 form the structure of the first sheet 56.

The second material 74 portion of the second sheet 54 as mentioned earlier comprises a polypropylene layer 74A having a melting temperature of from about 165° to 175° C. and a thickness of approximately 0.005 inches. Adhesive layer 76 would typically comprise a functionalized polypropylene having a thickness of 0.003 inches. The EVOH layer 78 would have a thickness of 0.004 inches, followed by another adhesive layer 76 having a similar thickness of 0.003 inches, the final layer 74B of polypropylene having a thickness of 0.005 inches. Regrind material layers of approximately 0.010 mils may be included in the second sheet as is well known to the art.

Figure 4A:
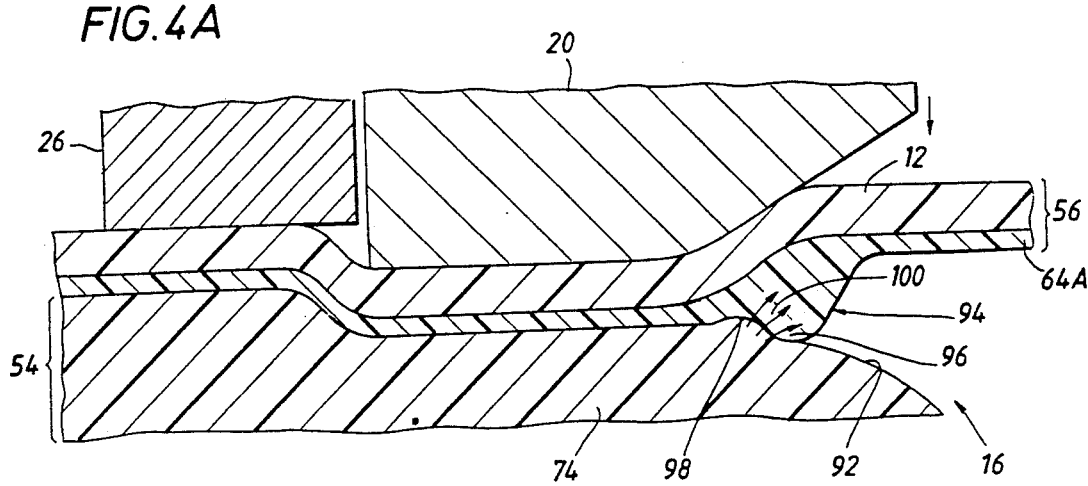
FIG. 4A shows a schematic representation in a side view and partial cross section of the lid material initially flowing from beneath the seal head contact area, after the clamp head has contacted the lid.
Figure 4B:
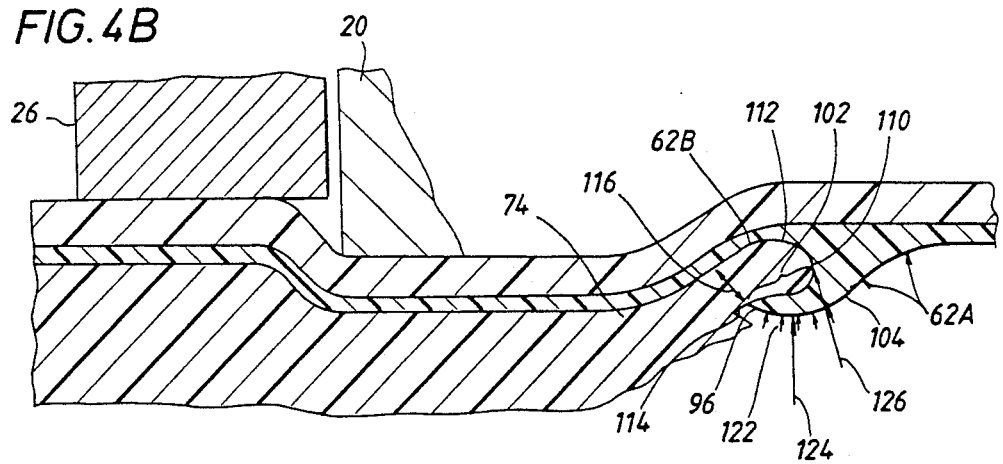
FIG. 4B shows a schematic representation in a side view and cross section of the interlocking first sheet wave and second sheet wave.
Figure 4C:
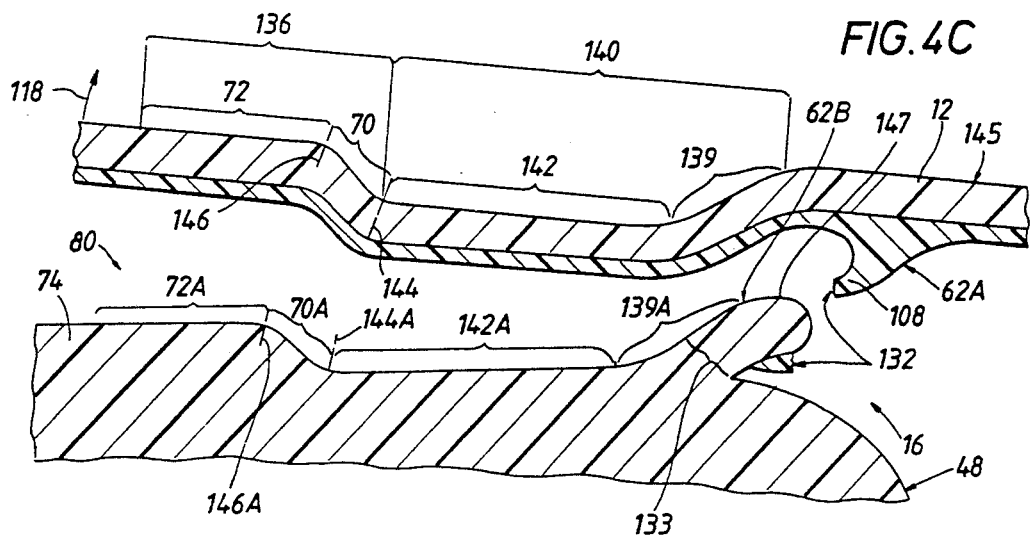
FIG. 4C shows a schematic representation in a side view and cross section showing the lid being peeled from the container.

Referring now to FIGS. 4A, 4B, and 4C the method of sealing the lid to the container, as well as the removal of the lid from the container is shown. Referring more specifically to FIG. 4A, the seal head 20, preferably heated to a temperature of from about 425° to 450° F., is shown driven into contact with the first sheet 56 at a sufficient distance to compress the first sheet and the top surface 92 together. As previously mentioned, the first sheet may be heated by driving a heated surface of the seal head 20 downward into contact with the first sheet, or the first sheet may be heated by radio frequency energy as is well known to art, prior to or during contact of the seal head with the first sheet. The second sheet 54 may also be (pre)heated by the application of RF energy, or in a preferred embodiment the second sheet is heated by thermal energy transferred from the first sheet into the second sheet, the thermal energy being delivered to the first sheet by contact of the heated seal head with the first sheet.

Clamp head 26, as mentioned earlier, has previously contacted the lid 12 and supplied clamping pressure to the lid, prior to contact of the heated seal head with the first sheet 56.

In operation, the heated seal head is driven downward into the first sheet and supplies sufficient pressure and thermal energy during the initiation of the lid sealing process, so as to melt the first material layer 64A to cause a portion of the layer to flow outward from underneath the contact area of the heated seal head so as to form a preliminary first sheet wave 94. Wave 94, for the purposes of comparison with FIG. 4B, can be seen to include the position of a preliminary first sheet wave apex 96. The thermal energy and pressure supplied by the seal head is also sufficient to begin the formation of a second sheet melted portion 98 having a preferential second sheet flow direction 100 as indicated by the arrows shown penetrating the layer 64A.

The initial step of the process used to form the interlocking waves of the article of the present invention can therefore be seen to include the formation at the inside rim of the container of the preliminary first sheet wave 94. The lower side of the preliminary wave 94 due to the selection of materials in the preferred embodiment is adhesively engaged with the second sheet top surface 92 such that the mass of the first material displaced from beneath the seal head tends to flow toward the container inside rim 16.

During the formation of the interlocking waves the clamp head continues to clamp the lid to the container so as to stabilize the lid relative to the container and also to maintain pressure on the first material and second material so as to prevent portions of the melted first material and/or melted second material from flowing to or towards the outside rim. The clamp head effectively dams softened or melted material from flowing beneath and/or beyond that portion of the clamp head in contact with the lid.

Referring now to FIG. 4B, a portion of the second sheet has been heated and/or pressured for a sufficient time to melt and/or displace a portion of the second material 74. The melted and/or displaced portion of the second sheet thereafter flows into the preliminary first sheet wave 94 (FIG. 4A) to form a second sheet wave 62B, simultaneously displacing a portion of the preliminary first sheet wave below the second sheet wave 62B so as to form the first sheet wave 62A, which interlocks over interlock area 102 with the second sheet wave 62B around the inside rim of the container.

The second sheet wave 62B in other words "jets" or flows upwardly into the preliminary first sheet wave 94 so as to divide the preliminary wave 94 into an upper and lower portion, the lower portion being labeled as the first sheet wave 62A. This wave 62A can be seen to have a first sheet wave crest surface 104 defined along its outer periphery, and also a first sheet wave apex 96 located at the distal end of the crest surface 104, the apex also being located at the distal end of the wave underside 108 (FIG. 4C) of the first sheet wave 62A.

In a similar manner, the second sheet wave 62B can be seen to include a second sheet wave apex 110 located at the distal end of the second sheet wave crest surface 112 and the second sheet wave underside 114. More specifically, the waves 62A, 62B can be seen to be overlapped between the first sheet wave apex and the second sheet wave apex to form the interlock area 102. The first sheet wave apex is located below the second sheet wave apex.

The distributed internal pressure 122 is represented by a series of small arrows formed normal to the first sheet wave crest surface 104. This distributed internal pressure may be represented by a center of pressure arrow 124 which represents a summation of the distributed internal pressure 122 over the area of interest. It can be seen that the shear couple A—A 116 counteracts the center of pressure arrow 124, representing in a graphical manner that the burst strength of the container/lid joint is enhanced by the thick wave root 133 (FIG. 4C) of the interlocking wave design.

It is well known that the distributed internal pressure 122 generates hoop stresses throughout the container/lid structure, these hoop stresses being counteracted by the shear force across the material of the second wave. The container/lid junction structure, by use of the interlocking waves 62A, 62B formed substantially normal to the distributed internal pressure 122, effectively resists destruction from internal pressures up to approximately 40 psi, (reference FIGS. 5A, 5B). A conventional container/lid junction structure merely relies on the adhesion of the lid to the container flange, without the support of an interlocking wave at the container/lid failure plane location.

For the purposes of graphical description, FIG. 4B also includes an apex pressure vector 126 defined normal to the first sheet wave crest surface 104 and tangentially intersecting the second sheet wave apex 110.

The pressures and temperatures, along with the container/lid junction materials, are selected such that after application of the clamp head and heated seal head the first sheet wave apex and the second sheet wave apex are located on opposite sides of a defined center of pressure 124, the center of pressure representative of that portion of the distributed internal pressure 122 contained within the sealed lid and container applied on the first sheet wave crest surface, between the first sheet wave apex and the apex pressure vector 126. Location of the first sheet wave apex in such a position increases the effective interlock area of the junction and reduces the magnitude of the shear stress that parallels the undersides of the waves 62A, 62B.

In preferred illustrative embodiment the seal head would be heated from approximately 425° to 450° F., and compressed against the container/lid structure for approximately one second at a constant pressure of from about 400 to about 550 psi.

It should be recognized in the article of the present invention that the first sheet wave apex 96 should at least extend leftward of the center of pressure arrow 124, although in an alternative embodiment the first sheet wave apex should at least extend leftward of the apex pressure vector 126, depending of course on the choice of materials used for the junction.

Referring now to FIG. 4C when the consumer wishes to remove the lid from the container, a peel force indicated by arrow 118 is applied at the edge of the first sheet such that the lid is lifted upwards away from the second sheet material so as to expose junction surface 80 at least over to the break point 132. It can therefore be envisioned that the peel initiation forces required to remove the lid from the container need only be sufficient to overcome any encountered adhesion of the first material from the second material from the container outside rim 18 (FIG. 2), through lid elevation change area 70A, up to break point 132, along of course with the force necessary to cause tensile fracture of the first material at break point 132. The peel force therefore is merely required primarily to overcome adhesive resistance forces, whereas for the container to burst the internal pressure forces must at least be sufficient to cause the second sheet wave to fail and shear at lines A—A in the area of the wave root 133.

As mentioned previously, in comparing the simple wave seal structure of FIG. 5B, (described in copending patent applications), to the clamped-wave seal structure shown in FIG. 2, it can be seen that the peel initiation forces are reduced significantly with the elimination of the interlocking waves 62C, 62D (FIG. 5B) from the container outside rim 18A, by the new clamped-wave seal structure, which has a (non)-bonded junction surface 80 in the previous location of the interlocking waves 62C, 62D.

Referring now more specifically to FIG. 4C the combined use of the clamp head 26 with the heated seal head 20 can be seen to form a unique clamped-wave sealing structure. Clamp head 26 initially contacts the lid 12 at a lid second portion 136 having upper surface 72 and lid elevation change area 70 which is that portion of the lid second portion that is distorted downward by subsequent contact of the heated seal head 20 with the lid first portion 140 located toward the inside rim of the container.

The lid first portion 140 can be seen to include lower surface 142, and lid bevel area 139 formed adjacent the lower surface by the imprint of the beveled portion of the heated seal head on the lid. The lid bevel area extends upwardly away from the lower surface toward the center of the container lid 143 (FIG. 1) and merges with the lid roof surface 145, portions of the interlocking waves typically being formed below the lower surface 142, the lid bevel surface, and the lid roof surface located adjacent the inside rim 16. Due to elastic deflection, the bevel surface 139 will generally have an angle less than the angle $\tau$ 88 formed in the heated seal head.

The shaped surface of the seal head and the shaped surface of the clamp head can therefore be seen to be adapted to form not only the first sheet wave and the second wave 62A, 62B, but also to form a lower surface 142 in the first portion 140 of the lid, as well as the upper surface 72 in a portion of the second portion 136 of the lid, as well as to form the lid elevation change area 70 between the upper surface 72 and the lower surface 142.

The lid elevation change area 70 can be seen to extend upwardly away from the lower surface 142 toward the upper surface 72, the lower surface being formed at an elevation lower than the upper surface by the downward movement of the heated seal head below the stop elevation of the clamp head. The lid elevation change area 70 can be seen to include a first slope change point 144 located adjacent the lower surface 142, as well as a second slope change point 146 located adjacent the upper surface 72. Depending on the relationship between the clamp head, seal head, and material properties of the lid and flange the lid slope may change very gradually or sharply at slope change points 144, 146. The material may form a radius, or a well defined ridgeline at one or the other, or both, of these points.

It can therefore be seen that the lid includes between the inside rim and the outside rim a lower surface displaced in a planar manner outward from the interlocking waves toward the outside rim, as well as a lid elevation change area extending upwardly away from the lower surface toward the outside rim, as well as an upper surface extending in a planar manner outward away from the lid elevation change area toward the outside rim.

In a similar manner, proceeding from the outside rim toward the inside rim the container second material 74 can also be seen to have upper surface 72A, second slope change point 146A, lid elevation change area 70A sloping downward, first slope change point 144A, lower surface 142A, and lid bevel area 139A extending upwardly from the lower surface 142A toward the center of the container. The relative dimensions and shape of the second material will depend on the amount of planar and material flow distortion(s) carried through the lid into the container material.

In an embodiment of the invention the second sheet wave includes elevation apex 147 at the uppermost portion of the wave, the apex 147 having a vertical elevation greater than lower surface 142A and greater than lid upper surface 72. Container upper surface 72A generally will have an elevation less than wave elevation apex 147, but greater than container lower surface 142A.

Since the support die 46 (FIG. 1) is located beneath and extends outwardly from the impact areas of the seal head and the clamp head the lower surfaces 142, 142A, elevation change areas 70, 70A, and a portion of the upper surfaces 72, 72A will all be located above the support die 46 after formation of the clamped wave seal structure. The lid 12 will extend at the same elevation outwardly away from the lid elevation change area toward the container outside rim.

Clamp head 26 effectively forms a dam for the melted portions of the lid and container melted by the heated seal head, so as to prevent their outward flow to or toward the outside rim of the container. Prevention of the flow of material toward the outside rim prevents the formation of interlocking waves with their resultant higher peel initiation forces about the outside rim of the container.

As can be seen in FIG. 4C in an embodiment of the invention the heated seal head is shaped such that the second sheet wave 62B remains with the container when the lid is peeled from the container. When peeled, the lid is removed intact across a failure plane just up to the point where the lid wraps around the container material. At this point the lid tears leaving a small portion of the first material attached to the container. The failure plane is defined through the junction of the material removed with the lid and the material that remains with the container.

Comparing the peel failure plane location of the present invention with that of the lid seal system set forth in U.S. Pat. No. 4,961,513 to Gossedge et al, it should be noted that Gossedge specifically states that leaving the ear on the container flange is unacceptable during the lid peel process, (Reference column 4 and 17 through 48 of Gossedge, and Gossedge FIG. 5). The operability of the Gossedge lid peel system is therefore highly dependent on the controlled thinness of both roots (34) of Gossedge, whereas no such sensitivity exists in our present invention. The present invention does not require the complex multiplanar die surface of Gossedge for proper lid-peel operation. Structurally, of course, the present invention does not include two pairs of interlocking waves, as taught by Gossedge, but includes one interlocking wave system adjacent the inside rim of the container, coupled with a lid elevation change area and an upper surface 72 extending in an uninterrupted manner towards the outside rim.

Figure 5C:
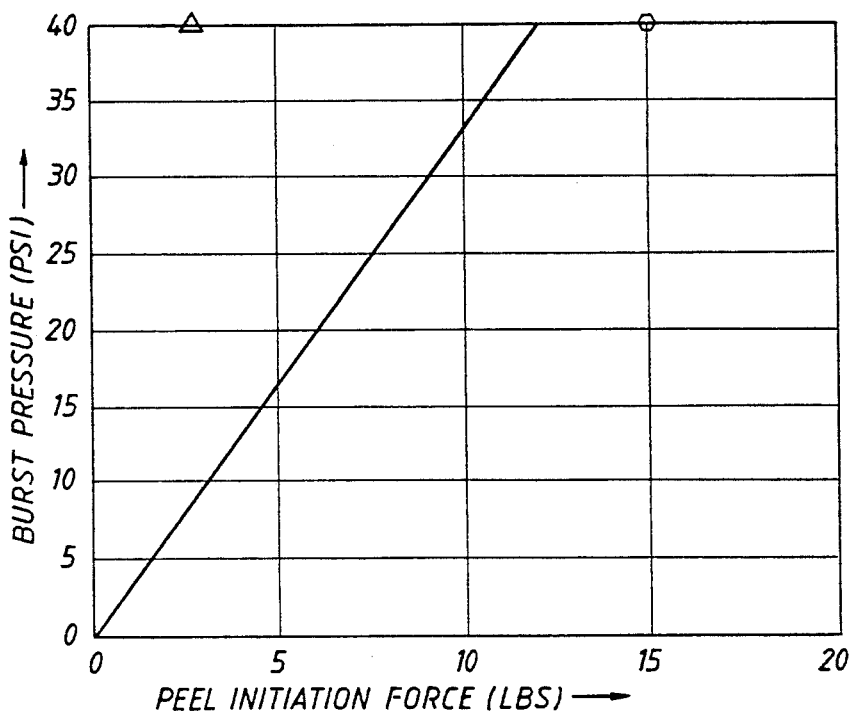
FIG. 5C shows a graph of burst pressure versus peel initiation force for the clamped-wave seal structure, simple wave seal structure, and conventional adhesive seal system.

Referring now to FIGS. 5A and 5C the advantages of the clamped-wave seal structure become readily apparent. At a burst pressure of 40 psi the clamped-wave seal structure has an average peel force of only 1.2 lbs., whereas the simple wave seal structure has an average peel force of 1.4 lbs., and the conventional adhesive seal system has an average peel force of approximately 2.5 lbs., (reference FIG. 5A). Even more importantly, as shown in FIG. 5C the peel initiation force has been significantly reduced from an initial value of from 12 to 15 lbs. (values for the conventional adhesive seal system and the simple wave seal structure respectively), to a value of 2.5 lbs. using the clamped-wave seal structure. The clamped-wave seal structure of the present invention therefore yields a container that is highly resistant to burst pressures encountered in retort processes, yet is easily openable and peelable.

Figure 6A:
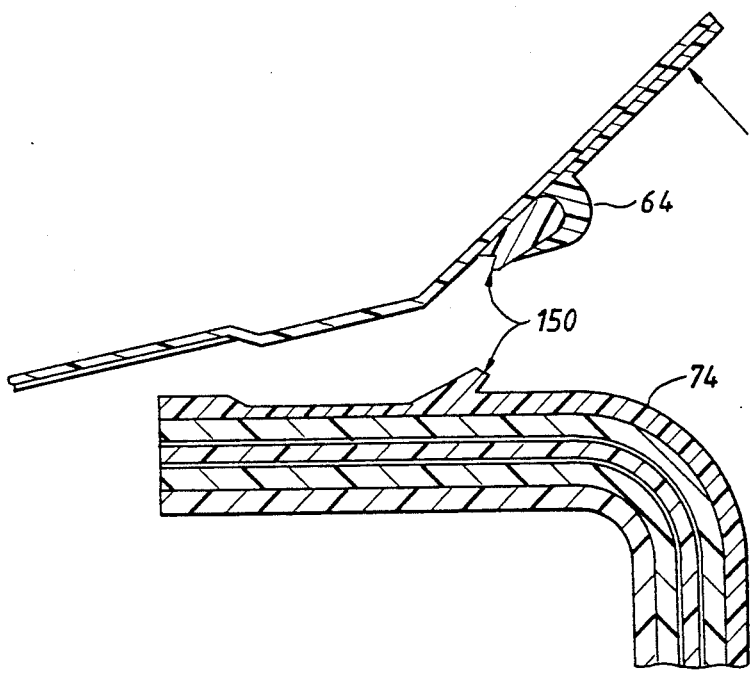
FIGS. 6A and 6B show a schematic representation in a side view and cross section of various burst pressure failure mechanisms of the clamped-wave seal system.
Figure 6B:
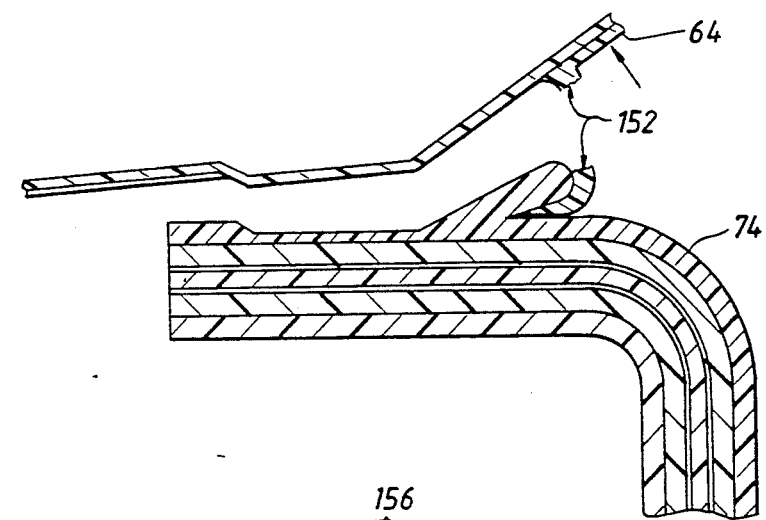

Referring now to FIGS. 6A and 6B it should be noted that a container can burst in two ways: pressurizing the inside of the package will cause either the container material 74 (polypropylene) or the lid material 64 (polyethylene) to fail. In the present case of a polypropylene cup and a high density polyethylene (HDPE) lid material, the preferred designed mode of failure is for the failure plane 150 to occur through the root of the wave, since this produces the highest burst values. In the second case (FIG. 6B), low density polyethylene (LDPE) 64 on the lid fails under the tensile load caused by internal pressure in the package, such as at failure plane 152. Waves displaying this type of failure generally have lower burst pressure than waves that fail at the root of the polypropylene portion of the wave.

One can see from the following Table 1 that the highest burst value, 40 psi, is achieved under seal conditions that result in 100% polypropylene failure across failure plane 150. Burst values are much lower, 11.5 psi to 27 psi when polyethylene failure occurs across failure plane 152 shown in FIG. 6B.

TABLE 1

| Energy Product* | Burst | % PP Failure Across Couple A—A | % PE Failure At Break Point 132 |
|---|---|---|---|
| Alcoa F8087 .002 AL//.0015 LDPE+ | | | |
| 1.00 E6 | 11.5 | 0 | 100 |
| 1.03 E6 | 27.2 | 3 | 40 |
| 1.32 E6 | 31.1 | 32 | 12 |
| 1.44 E6 | 25.4 | 0 | |
| DuPont .002 AL//.0015 HDPE | | | |
| .98 E6 | 13.1 | 0 | 100 |
| Alcoa A9373P1 .002 AL//.0015 HDPE++ | | | |
| .92 E6 | 33.0 | 72 | 20 |
| 1.14 E6 | 40.0 | 100 | 0 |

*Energy Product = Time(s) × Temp (R) × Pressure (psi)
+Ultimate Tensile Strength = 2000 psi
++Ultimate Tensile Strength = 6000 psi FAIL MODE ANALYSIS
76 mm DIA Cup In Table 1 it can be seen that the ultimate tensile strength of the lid material affects the burst strength. As can be seen, high density polyethylene lid sealants yielded burst strengths of a maximum 40 psi, whereas low density polyethylene sealants have produced burst strengths of a maximum of 31.1 psi.

Figure 7:
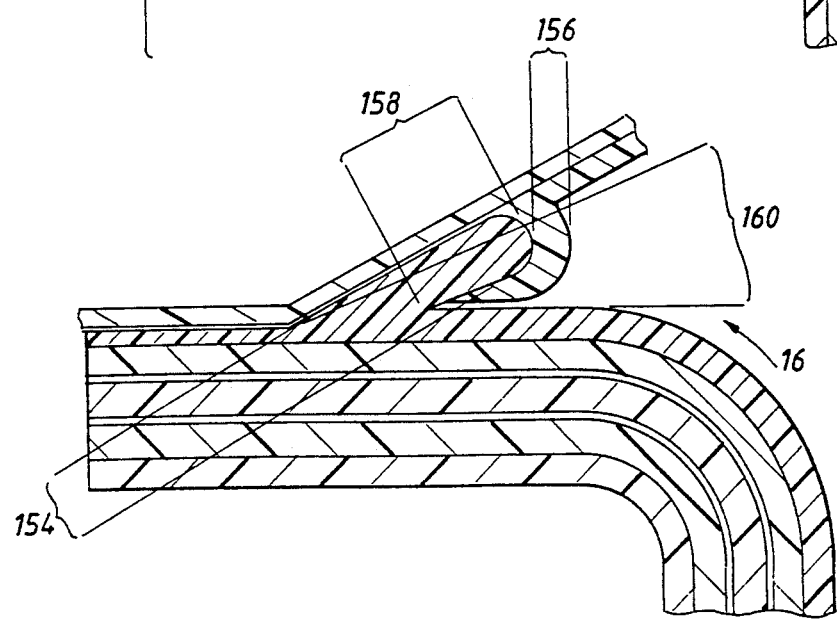
FIG. 7 shows a schematic representation in a side view in cross section of a typical interlocking wave system formed at the container inside rim.

Burst strength increases with the size of the wave. FIG. 7 provides a definition of wave measurement terms such as polypropylene width 154, polyethylene width 156, polypropylene length 158 and wave angle 160. In a preferred embodiment the polypropylene width 154 would be from approximately 0.005 to 0.010 inches, the polypropylene length 158 would be from 0.010 to 0.025 inches, the polyethylene width would be from 0.003 to 0.008 inches and the wave angle 160 would be from 20° to 50°. The length and width of the polypropylene wave may be multiplied together yielding a cross section area of the polypropylene.

Figure 8:
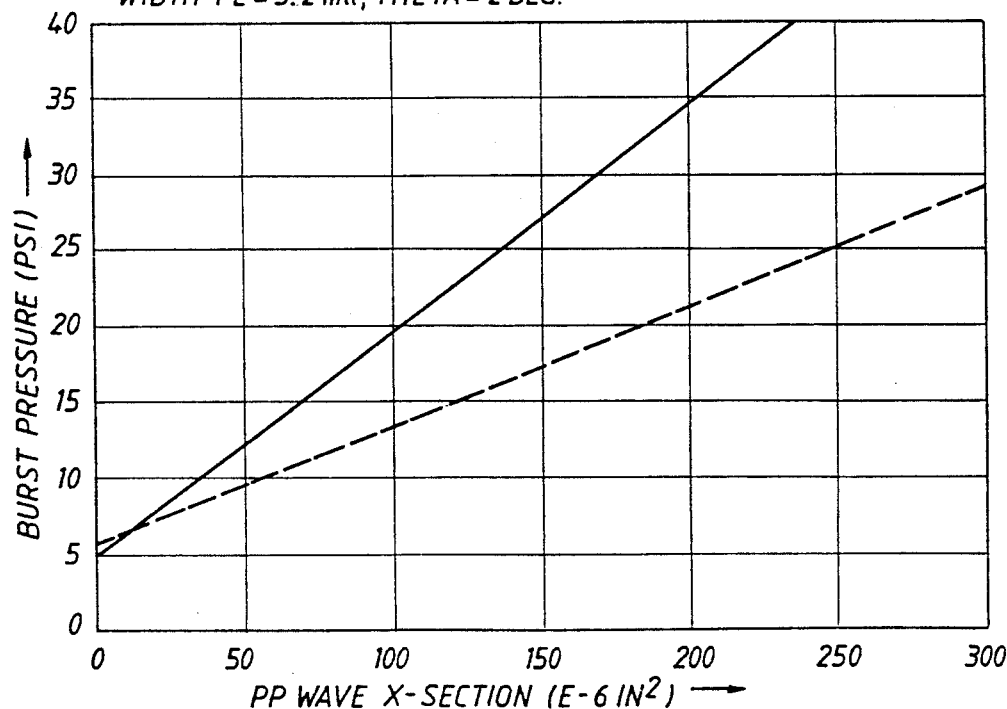
FIG. 8 is a graph showing the burst pressure versus polypropylene wave cross section in square inches for two different lid systems.

Referring now to FIG. 8, which is a plot of burst pressure versus cross section area of the polypropylene, it can be seen that burst pressure increases with an increase in the polypropylene wave cross section. Study of this figure may lead one to graphically anticipate burst pressures for other common lidding systems. Note that as the cross sectional area of the wave increases, so does the burst pressure.

By way of example, the following Table 2 sets forth the pre-retort burst and post-retort burst and peel initiation forces encountered for various lidding sealed to an oval tray. The advantages of the clamped-wave seal structure are readily apparent. Inspection of the peel initiation values highlights the easy peel feature of the clamped-wave technology.

TABLE 2

VARIOUS LIDDING SEALED TO OVAL TRAY

| Clamped-Wave Seal Structure | PRE-RETORT Burst | POST RETORT | | |
|---|---|---|---|---|
| | | Burst | Init. Peel | Av. Peel |
| Foil//HDPE | 30.0 psi | 28.0 psi | 6.5 lbs | 3.3 lbs |
| PET//PVDC//PET//HDPE | 26.7 psi | 20.7 psi | 4.4 lbs | 1.1 lbs |
| PET//PVDC//MOD HDPE | 28.0 psi | 18.3 psi | 4.8 lbs | 1.5 lbs |
| CONVENTIONAL SEAL | | | | |
| American National Can (PET//PVDC//NY// Aggressive Seal Adhesive) (Kee,0) | 26 psi | 19 psi | 11.5 lbs | 4.5 lbs |

The clamped-wave technology can also be used on packages of various shapes. Round, oval and rectangular geometries have been treated and the results are shown in Table 3 below. Notice that round geometry produces the highest results for burst pressures and that burst strengths are reduced as the package becomes less round.

TABLE 3

VARIATIONS OF PACKAGE GEOMETRY
Lid = PET//EVAX//LDPE

| Package Shape | Seal Conditions | Burst |
|---|---|---|
| 76 mm Round | 525° F., 1.4 s, 30 psi | 30 psi |
| 4.5 × 6.5 Oval | 570° F., 1.4 s, 60 psi | 25 psi |
| 4.5 × 6.5 Rectangle | 525° F., 1.2 s, 61 psi | 17 psi |

The clamped-wave sealing technology appears to be able to tolerate some contamination in the seal area. Conventional seal systems are sensitive to contamination, and food filling machine builders go to great lengths to stop food products from splashing on the flange of the package. Seal defect rates of 1 to 2% are not uncommon in conventional seal systems. Clamped-wave seal structures are apparently unhindered by contaminants as demonstrated in Table 4 below.

TABLE 4

CONTAMINATION STUDY
Lid = Foil//LDPE

| Contaminant | Seal Conditions | # Good/Tested |
|---|---|---|
| Chili Gravy | 600° F., 1.0 s, 40 psi | 25/25 |
| Chicken Fat | 550° F., 1.0 s, 35 psi | 25/25 |
| Butter Sauce | 550° F., 1.0 s, 35 psi | 22/22 |

Many other variations and modifications may be made in the apparatus and techniques hereinbefore described, both by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention. It should be well understood that many other material selections, as well as operating pressures and temperatures may be used and selected to achieve the clamped-wave seal structure teachings of the present invention.

I claim as my invention:

1. Apparatus for forming a peelable clamped-wave seal structure between a lid and a container flange, said apparatus comprising:

a die for supporting said flange and said lid, a heated seal head having a first shaped surface for pressing the lid and the flange on said supporting die, a clamp head having a second shaped surface and being positioned outward of said seal head, means for moving said seal head downwardly to contact said lid and to press and seal said lid to said container on the supporting die, and means for moving said clamp head downwardly into contact with said lid so as to clamp said lid and said container on said supporting die, wherein said first shaped surface has a planar portion and an angled portion, said second shaped surface has a second planar portion adjacent said first planar portion, and wherein the first shaped surface of the seal head extends downwardly further than the second shaped surface of the clamp head so that interlocking waves are formed adjacent an inside rim of the container, and a lid elevation change area is formed outward of said interlocking waves.

2. The apparatus of claim 1 wherein the angle of the angled portion of the first shaped surface is between about 30 and about 55 degrees with respect to the plane of the planar portion of the first shaped surface.

* * * * *